(12) United States Patent
Lee

(10) Patent No.: US 11,797,193 B2
(45) Date of Patent: Oct. 24, 2023

(54) ERROR DETECTION METHOD FOR MEMORY DEVICE

(71) Applicant: MACRONIX INTERNATIONAL CO., LTD., Hsinchu (TW)

(72) Inventor: Shih-Chung Lee, Katsuradaiminami (JP)

(73) Assignee: MACRONIX INTERNATIONAL CO., LTD., Hsinchu (TW)

(*) Notice: Subject to any disclaimer, the term of this patent is extended or adjusted under 35 U.S.C. 154(b) by 32 days.

(21) Appl. No.: 17/567,916

(22) Filed: Jan. 4, 2022

(65) Prior Publication Data

US 2023/0214127 A1  Jul. 6, 2023

(51) Int. Cl.
G06F 3/06  (2006.01)

(52) U.S. Cl.
CPC .......... *G06F 3/0619* (2013.01); *G06F 3/0653* (2013.01); *G06F 3/0655* (2013.01)

(58) Field of Classification Search
CPC ..... G06F 3/0619; G06F 3/0655; G06F 3/0653
See application file for complete search history.

(56) References Cited

U.S. PATENT DOCUMENTS

| | | |
|---|---|---|
| 9,361,182 B2 | 6/2016 | Hu et al. |
| 9,570,160 B1 * | 2/2017 | Shah ................ G11C 29/50004 |
| 2019/0348127 A1 | 11/2019 | Chin |
| 2021/0005265 A1 * | 1/2021 | Lee .......................... G11C 16/08 |
| 2021/0343351 A1 | 11/2021 | Chiang |
| 2022/0068363 A1 * | 3/2022 | Lee .................... G11C 11/40626 |
| 2022/0230692 A1 | 7/2022 | Jiang |
| 2023/0049201 A1 * | 2/2023 | He ........................ G11C 29/883 |
| 2023/0060943 A1 * | 3/2023 | Xu ........................ G06F 3/0619 |

FOREIGN PATENT DOCUMENTS

TW           I569273 B       2/2017

* cited by examiner

*Primary Examiner* — Mark A Giardino, Jr.
(74) *Attorney, Agent, or Firm* — McClure, Qualey & Rodack, LLP

(57) ABSTRACT

The disclosure provides an error detection method for a memory device, wherein the memory device comprises a plurality of memory blocks, and each of the memory blocks has a plurality of word lines connected to a plurality of memory cells, the error detection method comprises the following steps. Performing a plurality of times of programming operations on the memory cells connected to each of the word lines to program the memory cells as a plurality of programming-level states. Performing a plurality of times of verifying operations on the memory cells to verify the programming-level states respectively. When the number of verifications of the verifying operations for one of the programming-level states is greater than an upper limit number corresponding to the one of the programming-level states, marking the word line as an error word line.

5 Claims, 15 Drawing Sheets

ERROR DETECTION METHOD FOR MEMORY DEVICE

TECHNICAL FIELD

The disclosure relates to an error detection method for a semiconductor device, particularly relates to a method for detecting abnormal programming operations of a memory device.

BACKGROUND

Uncertainties in the manufacturing process may cause defects in the hardware components of the memory device. Furthermore, during the use of the memory device, after times of programming/erasing cycles are performed, the memory device may be also gradually worn-out. Either defects during the manufacturing process or wearing-out during use, errors in stored data of the memory device may be induced.

For a worst case, abnormality exists in the memory device and causes errors in programmed data written in the memory device. But, some of programming-level states of the memory device still pass verification, hence programmed data is misjudged as being correct. Then, programmed data is read, however, errors in programmed data cannot be corrected and recovered by an error correction mechanism (e.g., by an error correction code (ECC)).

In view of the above technical problems, skilled ones of related industries in this technical field are devoted to detect abnormal conditions of memory devices at an earlier stage, and to isolate memory blocks (or word lines) detected as abnormal to protect programmed data.

SUMMARY

According to one aspect of the disclosure, an error detection method for a memory device is provided. Wherein the memory device comprises a plurality of memory blocks, and each of the memory blocks has a plurality of word lines connected to a plurality of memory cells, the error detection method comprises the following steps. Performing a plurality of times of programming operations on the memory cells connected to each of the word lines to program the memory cells as a plurality of programming-level states. Performing a plurality of times of verifying operations on the memory cells to verify the programming-level states respectively. When the number of verifications of the verifying operations for one of the programming-level states is greater than an upper limit number corresponding to the one of the programming-level states, marking the word line as an error word line.

According to another aspect of the disclosure, an error detection method for a memory device is provided. Wherein the memory device comprises a plurality of memory blocks, and each of the memory blocks has a plurality of word lines connected to a plurality of memory cells, the error detection method comprises the following steps. Performing a plurality of times of programming operations on the memory cells connected to each of the word lines to program the memory cells as a plurality of programming-level states. Performing a plurality of times of verifying operations on the memory cells to verify the programming-level states respectively. When the amount of memory cells passing verification for one of the programming-level states is less than a lower limit amount, marking the word line as an error word line.

According to still another aspect of the disclosure, an error detection method for a memory device is provided. Wherein the memory device comprises a plurality of memory blocks, and the memory blocks comprise at least a first memory block and a second memory block, the error detection method comprises the following steps. Performing a plurality of times of programming operations on a plurality of memory cells of the first memory block and a plurality of memory cells of the second memory block to program the memory cells of the first memory block and the memory cells of the second memory block as a plurality of programming-level states. Performing a plurality of times of verifying operations on the memory cells of the first memory block and the memory cells of the second memory block to verify the programming-level states respectively. When a difference value between the number of verifications of the verifying operations for the same programming-level state of the first memory block and the second memory block is greater than a standard number, marking the first memory block and/or the second memory block as error memory block(s).

Figure 1A:
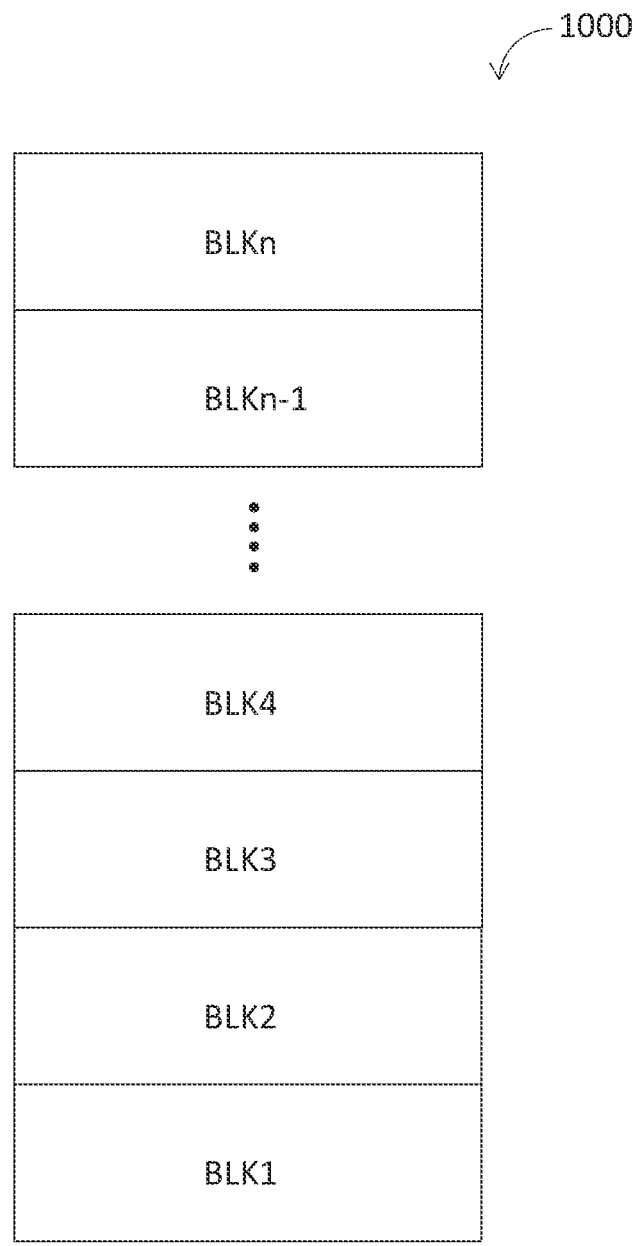
FIG. 1A is a schematic diagram of a memory device to which the error detection method of an embodiment of the disclosure is applied.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

DETAILED DESCRIPTION

Figure 1B:
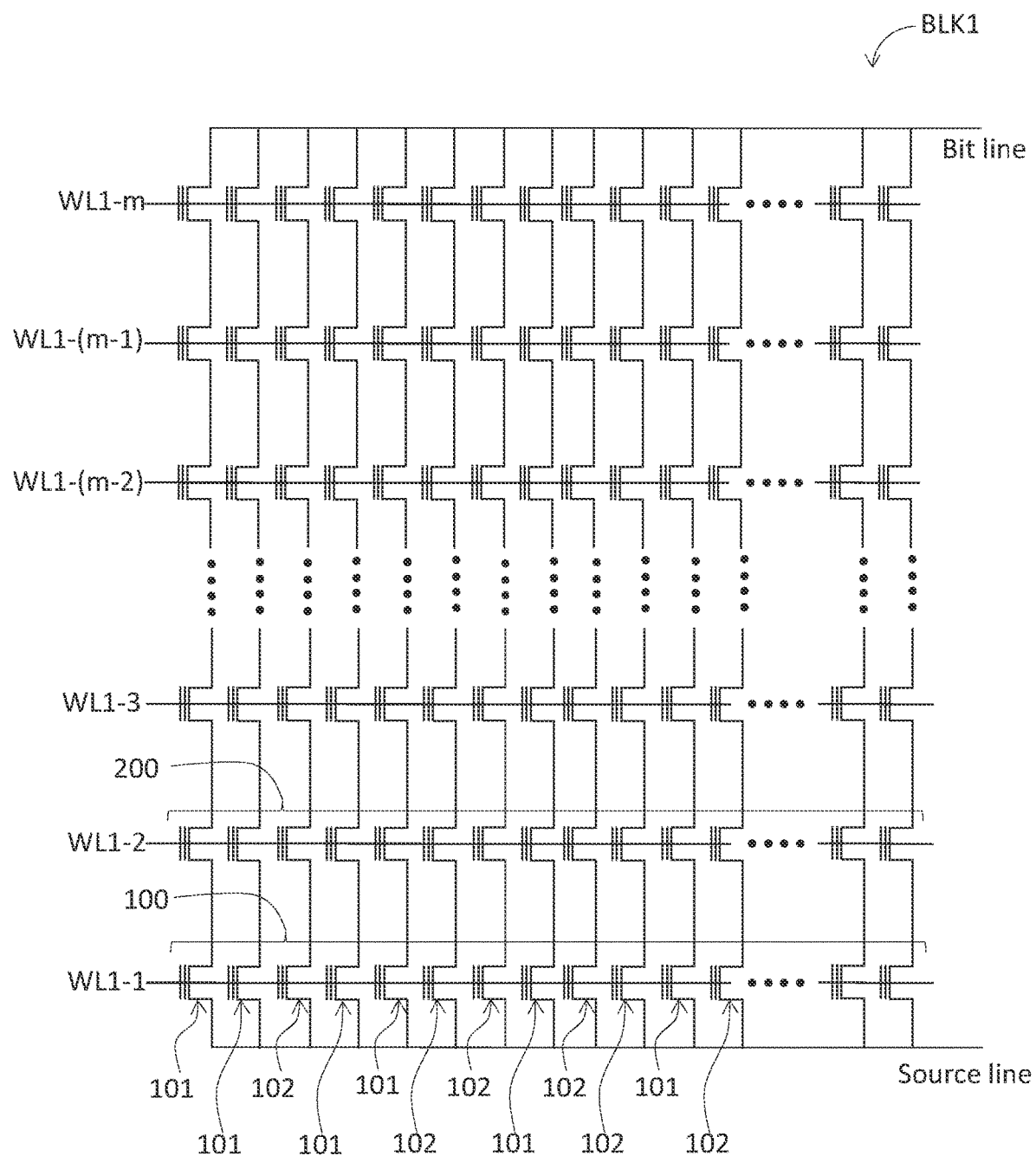
FIG. 1B is a circuit diagram of the memory block of the memory device in FIG. 1A.

FIG. 1A is a schematic diagram of a memory device 1000 to which the error detection method of an embodiment of the disclosure is applied, and FIG. 1B is a circuit diagram of the memory block BLK1 of the memory device 1000 in FIG. 1A. Please refer to FIGS. 1A and 1B, the memory device 1000 includes a plurality of memory blocks BLK1~BLKn, and each of the memory blocks BLK1~BLKn has a plurality of word lines. For example, the memory block BLK1 has word lines WL1-1 to WL1-$m$.

Furthermore, each of the word lines WL1-1~WL1-$m$ is connected to a plurality of memory cells. For example, the word line WL1-1 is connected to a plurality of memory cells 100, and the word line WL1-2 is connected to a plurality of memory cells 200. In this embodiment, each of the memory cells 100 and 200 may refer to, for example, a multi-level cell, which can store multi-bit data.

Figure 2:
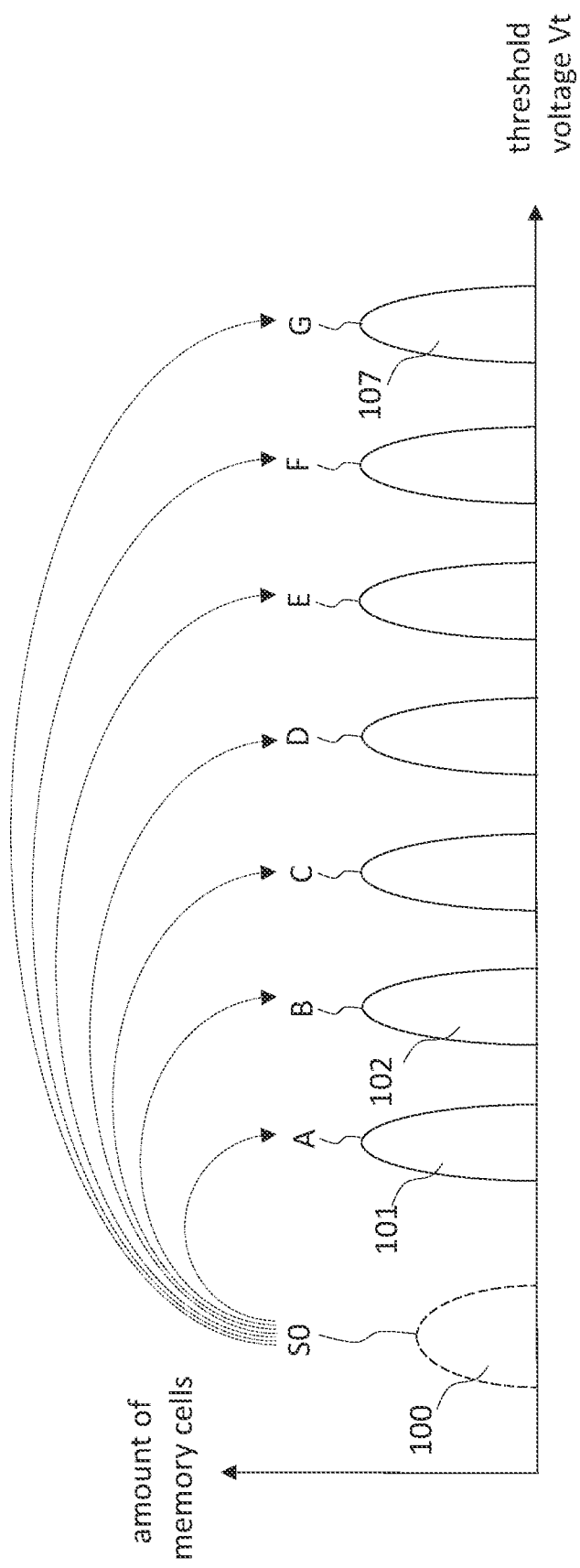
FIG. 2 is a schematic diagram of the threshold voltage distribution of different programming-level states after the memory device is performed with programming operations.

FIG. 2 is a schematic diagram of the threshold voltage distribution of different programming-level states A~G after the memory device 1000 is performed with programming operations. Please refer to FIG. 2 (also see FIG. 1B by reference), taking the word line WL1-1 of the memory block BLK1 of the memory device 1000 as an example, all the memory cells 100 connected to the word line WL1-1 are in the erase state, i.e., "S0-state", hereinafter referred to as erase state S0. The erase state S0 may correspond to three-bit data "1, 1, 1". In one example, the memory device 1000 may refer to, e.g., a floating gate memory or a charge trapping memory. When a programming operation is performed on the memory cells 100 of the memory device 1000, a plurality of programing pulses can be applied to the control gates of the memory cells 100, so as to make the amount of charges in the floating gates of the memory cells 100 change. Therefore, to increase the threshold voltage Vt of the memory cells 100 to different levels of voltage distribution, hence the memory cells 100 may be in different programming-level states. In other examples, the memory device 1000 may also refer to other types of non-volatile memory. After a plurality of programming pulses are applied, threshold voltage Vt of memory cells 100 of memory device 1000 of types of non-volatile memory may be enhanced to different programming-level states. Taking the memory cells 100 as triple level cells (TLC) as an example, after a plurality of programming operations are performed, the memory cells 100 can be programmed as seven programming-level states. For example, a part of the memory cells 100, which are memory cells 101, may be programmed as a lower level of "A-state" (also referred to as "A-level", hereinafter referred to as "programming-level state A"). In addition, another part of the memory cells 100, which are memory cells 102, may be programmed as a next lower level of "B-state" (also referred to as "B-level", hereinafter referred to as "programming-level state B"). Likewise, still another part of the memory cells 100, which are memory cells 107, may be programmed as a higher-level of "G-state" (also referred to as "G-level", hereinafter referred to as "programming-level state G").

Figure 3A:
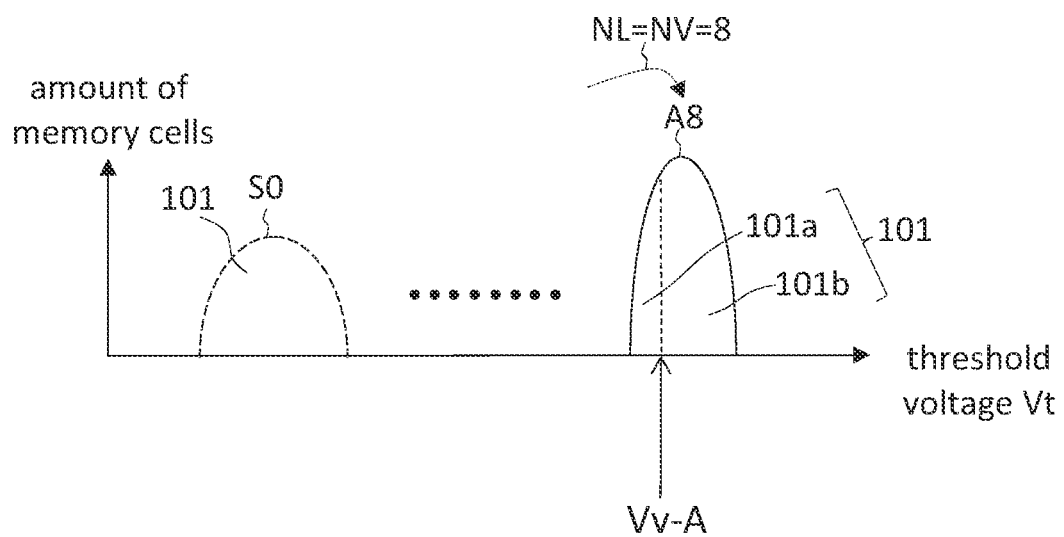
FIGS. 3A to 3C are schematic diagrams of programming operations and verifying operations in one of the programming-level states.
Figure 3B:
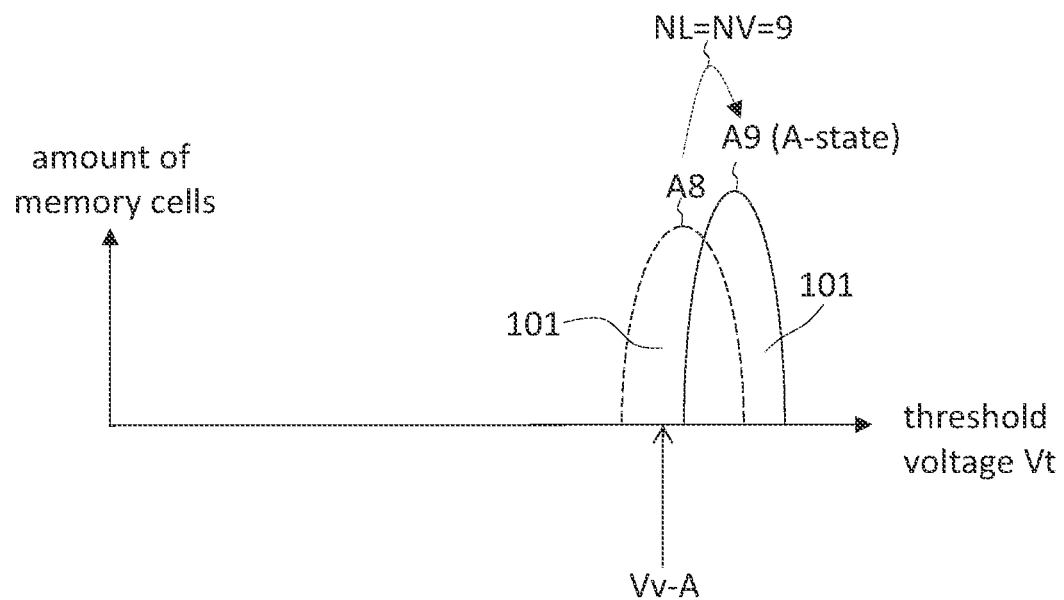
Figure 3C:
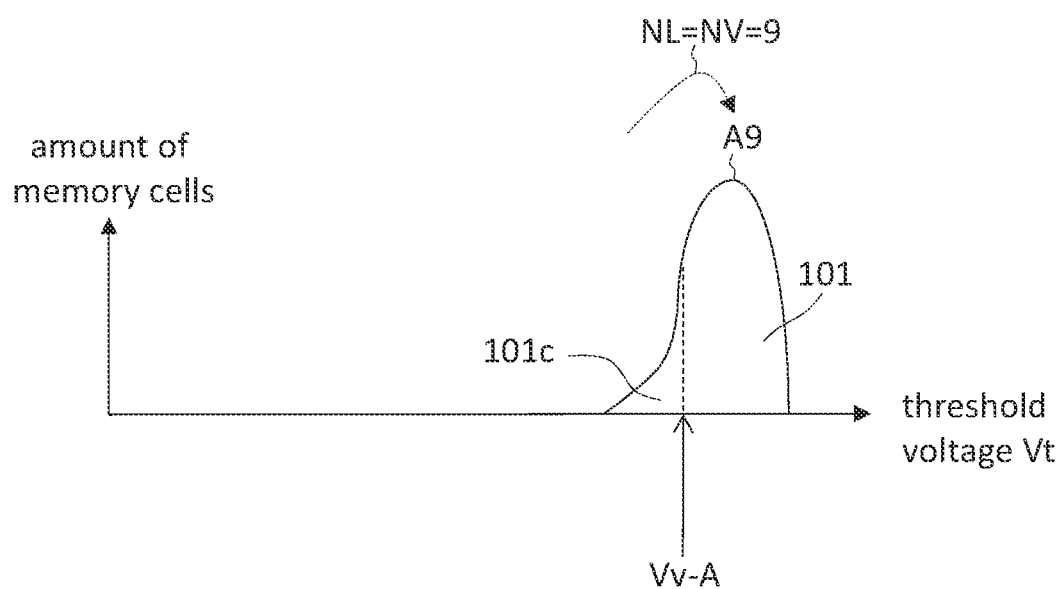

FIGS. 3A to 3C are schematic diagrams of programming operations and verifying operations in programming-level state A. Please refer to FIG. 3A first, the error detection method of this embodiment can be executed from a lower level of programming-level state A. A part of the memory cells 101 in the memory cells 100 is to be programmed as programming-level state A, and these memory cells 101 are originally in erased state S0.

After performing one time of programming operation on the memory cells 101 to apply one time of programming pulse, the threshold voltage Vt of the memory cells 101 can be increased. Furthermore, one time of verifying operation is performed to determine whether the threshold voltage Vt of the memory cells 101 is greater than a verification reference voltage Vv-A. Applying one time of programming pulse and performing one time of verifying operation, may be referred to as one time of "programming loop".

After performing several times of programming loops (for example, eight times of programming loops), the memory cells 101 are enhanced from erased state S0 to a temporary (or intermediate) level state A8. Herein, for level state A8, the number of times of executing programming loops, which is referred to as "NL", is "8" (i.e., number of programming loops "NL"=8). Furthermore, the number of times of executing verifying operations, which is referred to as "NV", is also "8" (i.e., number of verifications "NV"=8). When the memory cells 101 are in temporary level state A8, threshold voltage Vt of the memory cells 101$b$ is greater than the verification reference voltage Vv-A and hence pass verification. However, threshold voltage Vt of the other part of the memory cells 101, said, the memory cells 101$a$, is still less than the verification reference voltage Vv-A and not passing verification yet. Therefore, more times of programming loops need to be performed to further increase threshold voltage Vt of the memory cells 101.

Next, referring to FIG. 3B, after the ninth times of programming loop is executed (meanwhile, the number of programming loops NL is "9", and the number of verifications NV is "9"), the memory cells 101 are enhanced to level state A9. When in the level state A9, the threshold voltages Vt of all the memory cells 101 are greater than the verification reference voltage Vv-A and hence pass the verification for all, and programming of the memory cells 101 is completed. The level state A9 may refer to the target programming-level state A (i.e., "A-state" shown in FIG. 3B).

In the error detection method of the disclosure, an corresponding upper limit number Nmax may be respectively set for corresponding one of programming-level states A~G, such as, an upper limit number Nmax-A may be set for programming-level state A. Furthermore, number of verifications NV in the programming-level state A is compared to check whether it is greater than the upper limit number Nmax-A corresponding to programming-level state A. (In another example, it may also check whether the number of programmed loops NL corresponding to programming-level state A is greater than the upper limit number Nmax-A corresponding to programming-level state A). When the number of verifications NV is greater than the upper limit number Nmax-A, (i.e., number of verifications is too many), it indicates that programming operation of the programming-level state A is abnormal, and memory cells 101 and/or word line WL1-1 (which is connected to the memory cells 101) may be determined as having defects in hardware components and hence operates abnormally.

For example, the word line WL1-1 and its adjacent word line may be short-circuited, or the word line WL1-1 and the channel region may be short-circuited. In this embodiment, the upper limit number Nmax-A corresponding to programming-level state A is set as "10", and number of verifications NV of "9" for programming-level state A is less than the upper limit number Nmax-A of "10", indicating that programming operations of programming-level state A are normally performed, and it may be determined that the word line WL1-1, which is connected to the memory cells 101, also operates normally (i.e., determining that word line WL1-1 is a "healthy" word line).

However, as shown in FIG. 3C, if the word line WL1-1 operates abnormally, it may cause a larger amounts of defective memory cells 101c. The defective memory cell 101c may be referred to as "slow" bits or "tail" bits. The threshold voltage Vt of these memory cells 101c is still lower than the verification reference voltage Vv-A and cannot pass verification, hence, more programming loops need to be performed.

Figure 4:
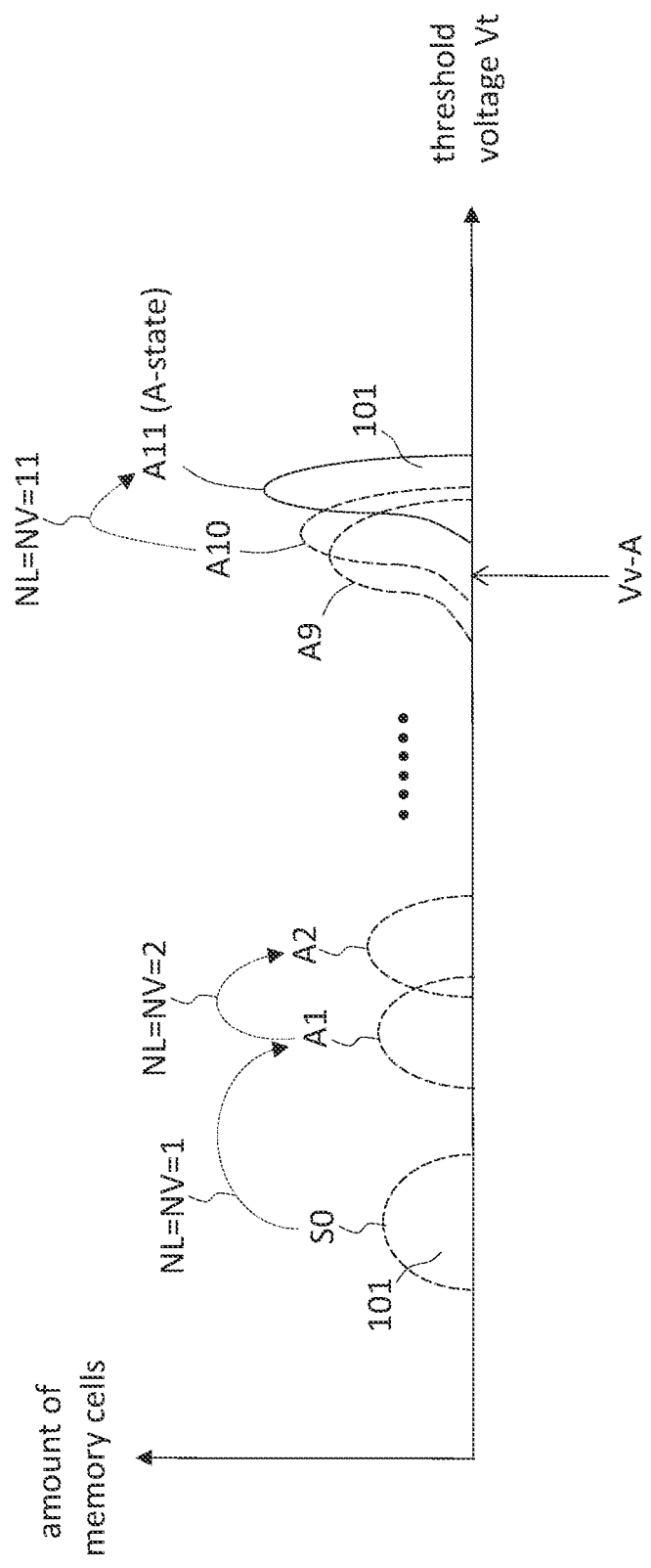
FIG. 4 is a schematic diagram illustrating executing several times of programming loops to make one of the programming-level states pass the verification.

Next, please refer to FIG. 4, which illustrates executing several times of programming loops to make the programming-level state A pass the verification. If the word line WL1-1 operates abnormally, for example, it is necessary to perform eleven times of programming loops (number of programming loops NL is "11" and number of verifications NV is "11") to make all the memory cells 101 pass the verification. Herein, the number of verifications NV of "11" in the programming-level state A (i.e., "A-state" shown in FIG. 4) is greater than the upper limit number Nmax-A of "10", indicating too many number of verifications. Therefore, it may be determined that programming operations for the programming-level state A may be failed or abnormal, and an information of "status of abnormal programming operation" is reported. It may be also determined that the word line WL1-1 connected to the memory cells 101 may have defect in hardware component and cause abnormal operation, and the word line WL1-1 is marked as an error word line or "risky" word line.

Figure 5:
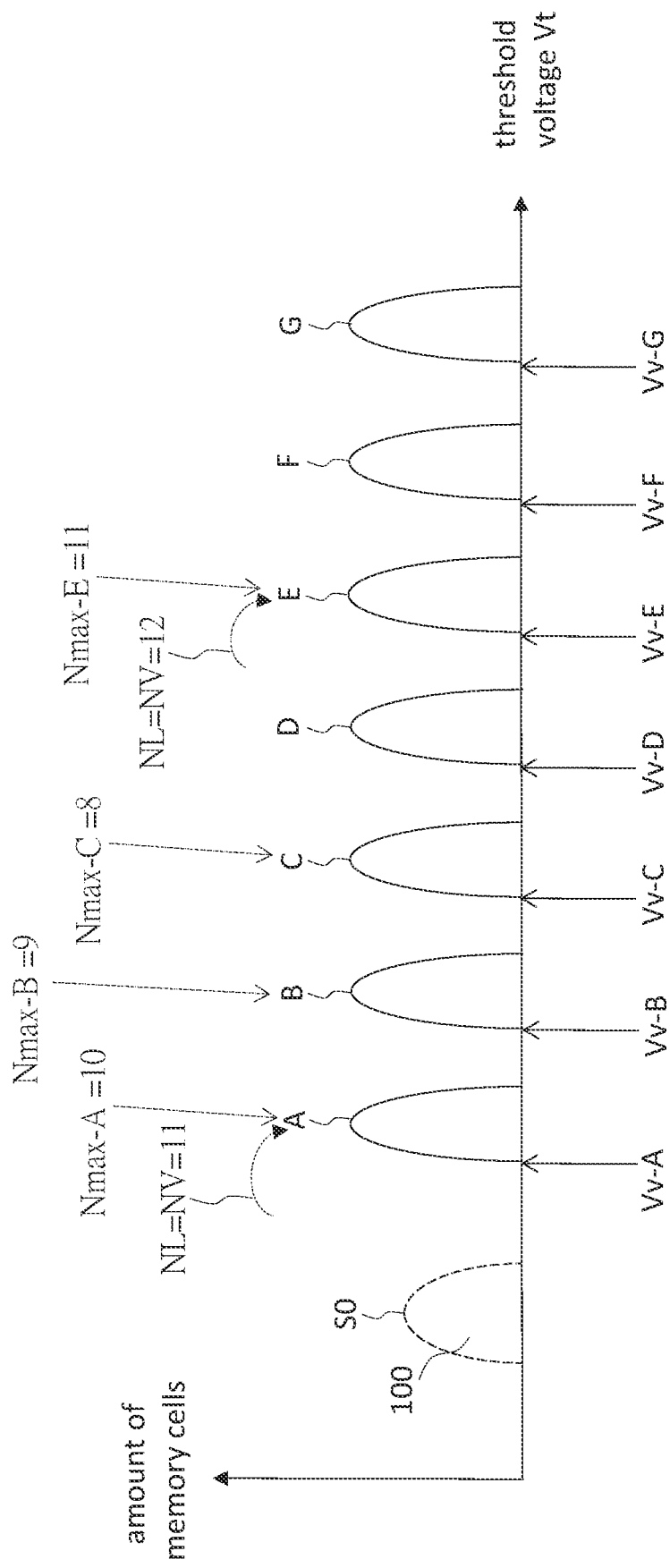
FIG. 5 is a schematic diagram illustrating the verification reference voltages and the number of verifications for different programming-level states.

FIG. 5 is a schematic diagram illustrating the verification reference voltages Vv-A~Vv-G and the number of verifications NV for different programming-level states A~G. Referring to FIG. 5, the memory cells 100 may be programmed as seven programming-level states A~G respectively, and verifying operations may be performed respectively according to the verification reference voltages Vv-A~Vv-G. Number of verifications NV for each of the programming-level states A~G may be respectively compared with the corresponding upper limit number Nmax, so as to check whether number of verifications NV is greater than the upper limit number Nmax. Different programming-level states may have different values of upper limit number Nmax, such as, upper limit number Nmax-A of "10" may correspond to programming-level states A, upper limit number Nmax-B of "9" may correspond to programming-level states B, upper limit number Nmax-C of "8" may correspond to programming-level states C, . . . , and upper limit number Nmax-E of "11" may correspond to programming-level states E, . . . , etc. When number of verifications NV of any one of programming-level states A~G is greater than the upper limit number Nmax, it may be determined that the word line WL1-1, which is connected to the memory cells 100, may have defect in hardware component and result in abnormal operation, and the word line WL1-1 is marked as an error word line. For example, number of verifications NV of "11" for programming-level state A is greater than the upper limit number Nmax-A of "10" corresponding to programming-level state A, and number of verifications NV of "12" for programming-level state E is also greater than the upper limit number Nmax of "11" corresponding to programming-level state E, it may be determined that word line WL1-1 connected to the memory cells 100 may operate abnormally.

In an example, when number of verifications NV for a lower-level of programming-level state is greater than the upper limit number Nmax, programming operation for the memory cells 100 of the word line WL1-1 may be stopped or terminated immediately, and no more programming operations will be performed for higher-level programming-level states. For example, if number of verifications NV of "11" for programming-level state A is greater than the upper limit number Nmax-A of "10" corresponding to programming-level state A, then programming operation will not be performed to higher-level of programming-level states B~G.

In another example, verification result of the previous programming-level state and verification result of the current programming-level state can be used to determine whether programming operations are abnormal. For example, if the previous programming-level state A has passed verification, and number of verifications NV of "9" for the current programming-level state B has reached the upper limit number Nmax-B of "9" corresponding to programming-level state B but still fails the verification, it may be determined that programming operations are abnormal.

Figure 6:
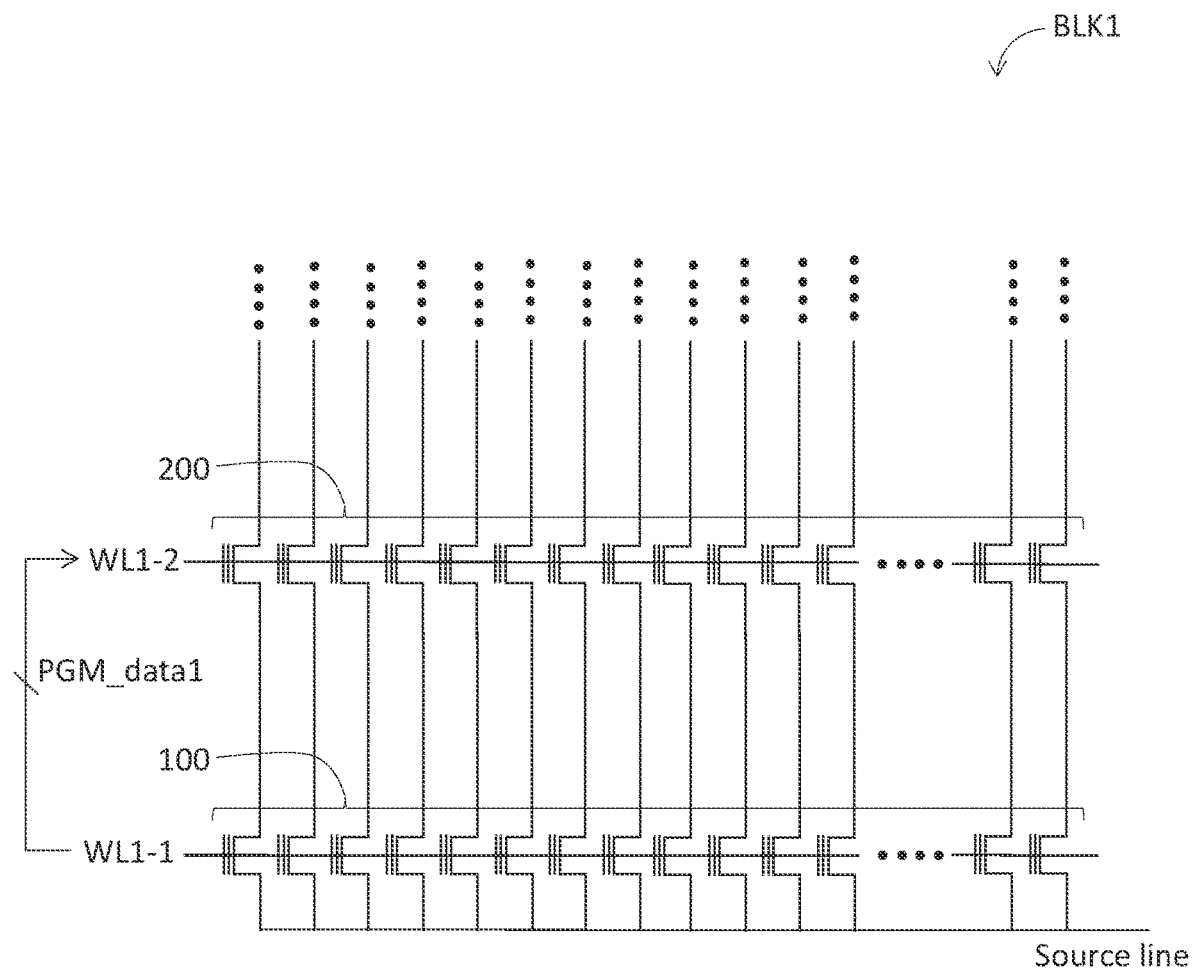
FIG. 6 is a schematic diagram illustrating reading a programmed data of the error word line and writing it to another word line, in the error detection method of an embodiment of the disclosure.

FIG. 6 is a schematic diagram illustrating reading a programmed data of the error word line and writing it to another word line, in the error detection method of an embodiment of the disclosure. Please refer to FIG. 6, when number of verifications NV for any one of the programming-level states A~G is greater than the upper limit number Nmax, the word line WL1-1 may be marked as an error word line, and a programmed data PGM_data1 in the memory cells 100 connected to the error word line WL1 can be read. Furthermore, the programmed data PGM_data1 is written into another word line. For example, the word line WL1-2 operates normally, and programmed data PGM_data1 may be written into the memory cells 200 connected to the word line WL1-2, so as to preserve programmed data PGM_data1. It may achieve effects of protecting correct data with data recovery.

Figure 7:
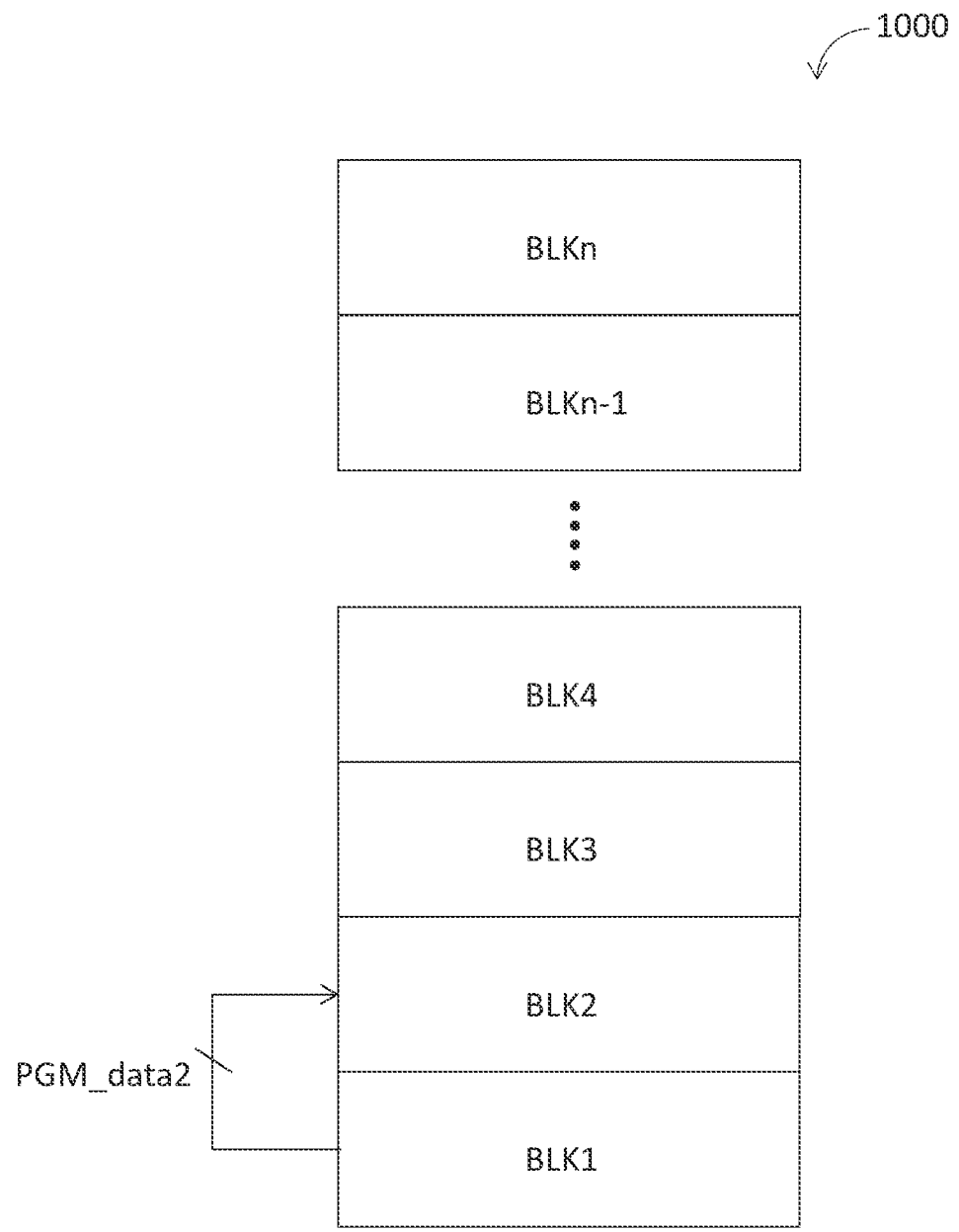
FIG. 7 is a schematic diagram illustrating reading a programmed data of an error memory block and writing it to another memory block, in the error detection method of an embodiment of the disclosure.

FIG. 7 is a schematic diagram illustrating reading a programmed data of an error memory block and writing it to another memory block, in the error detection method of an embodiment of the disclosure. Please refer to FIG. 7, the memory block BLK1 to which the error word line WL1-1 belongs may be marked as an error memory block, and programming operations for memory cells connected to all word lines WL1-1~WL1-$m$ in the error memory block BLK1 may be stopped. Furthermore, a programmed data PGM_data2 in the memory cells of the error memory block BLK1 may be read, and the programmed data PGM_data2 may be written into another memory block. For example, if the memory block BLK2 operates normally, programmed data PGM_data2 is written into the memory block BLK2 to preserve programmed data PGM_data2.

Figure 8A:
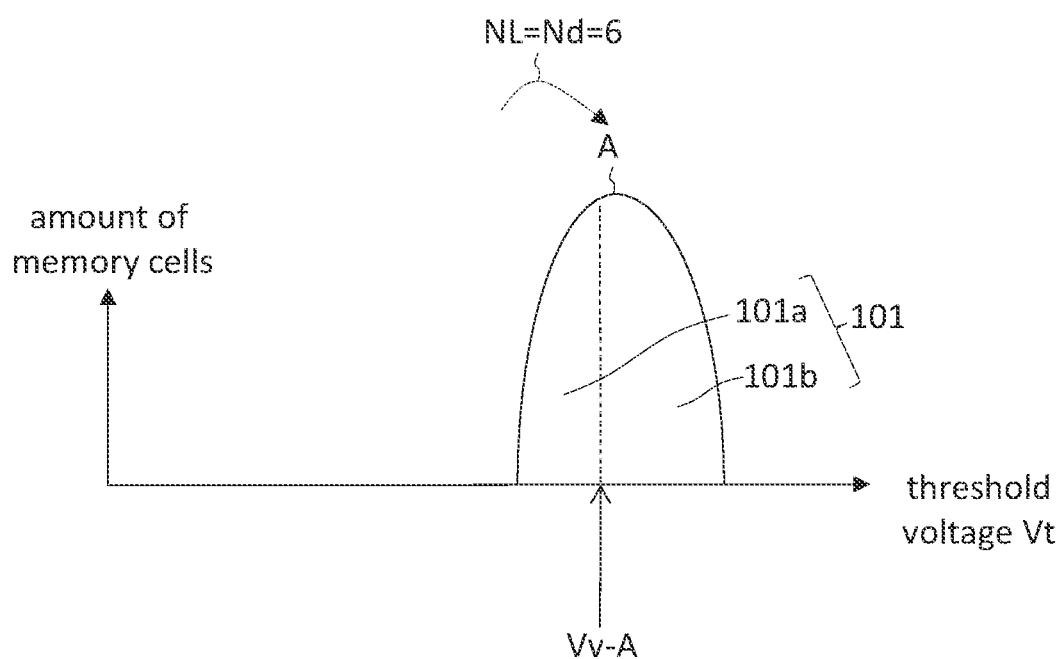
FIGS. 8A to 8C are schematic diagrams illustrating analyzing the amount of memory cells passing verification, in the error detection method of another embodiment of the disclosure.
Figure 8B:
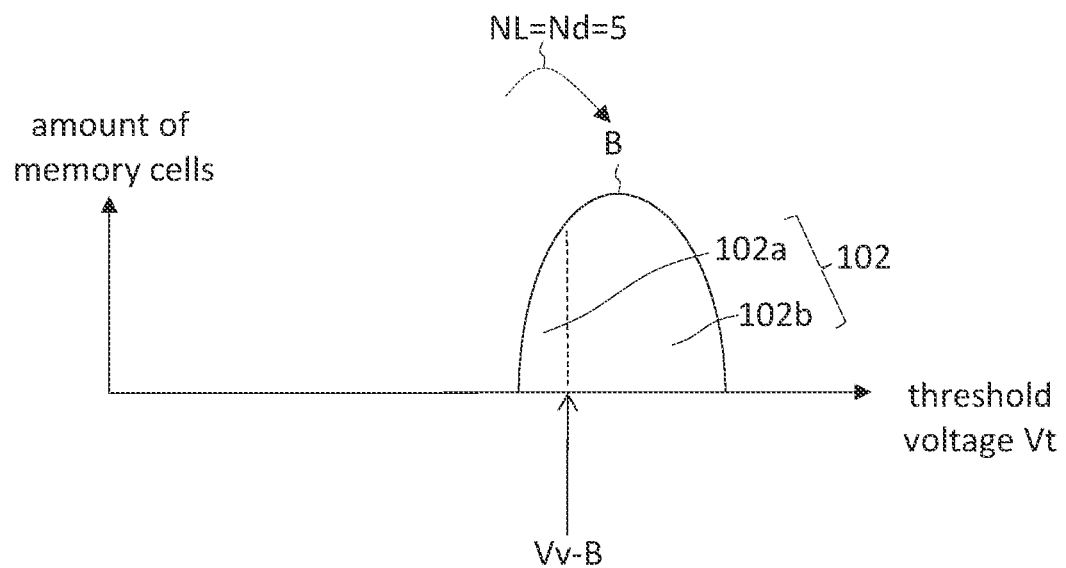
Figure 8C:
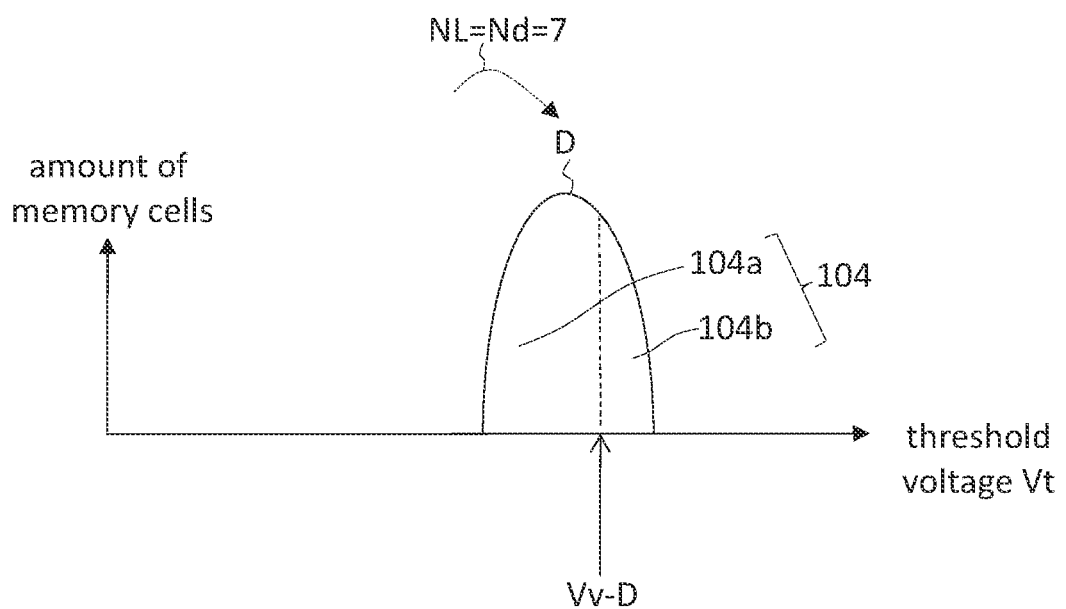

FIGS. 8A to 8C are schematic diagrams illustrating analyzing the amount of memory cells passing verification, in the error detection method of another embodiment of the disclosure. In the embodiment shown in FIGS. 8A to 8C, programming operations may be determined as abnormal according to the amount of memory cells having passed verification. Please refer to FIG. 8A (also see FIG. 1B by reference), a predetermined number "Nd" of programming loops for the memory cells 101 in the programming-level state A can be set as "6". When the memory cells 101 are executed with six times of programming loops (i.e., number of programming loops NL is "6") has reached the predetermined number Nd of "6", amount of memory cells 101b which have passed verification (i.e., threshold voltage Vt is greater than the verification reference voltage Vv-A) may be analyzed. When amount of memory cells 101*b* is less than or equal to a lower limit amount Cmin, it may be determined that programming operations for the memory cells 101 have failed, and determined that the word line WL1-1 connected to the memory cells 101 operates abnormally. Furthermore, the word line WL1-1 is marked as a wrong word line.

In an example (similar to the example in FIG. 6), when the amount of memory cells 101*b* (which pass verification) is less than or equal to the lower limit amount Cmin, programming operations for all memory cells 100 connected to the wrong word line WL1-1 may be terminated. In addition, programmed data PGM_data1 in the memory cells 100 connected to the error word line WL1-1 may be read, and programmed data PGM_data1 may be written into memory cells 200 of another word line which operates normally (for example, word line WL1-2), so that programmed data PGM_data1 may be preserved.

In another example (similar to the example in FIG. 7, when the amount of memory cells 101*b* (which has passed verification) is less than or equal to the lower limit amount Cmin, the memory block BLK1 to which the error word line WL1-1 belongs may be marked as an error memory block, and programming operations for memory cells connected to all the word lines of the error memory block BLK1 may be terminated. Furthermore, programmed data PGM_data2 in the memory cells of the error memory block BLK1 may be read, and programmed data PGM_data2 may be written into memory cells of another normally operated memory block (for example, the memory block BLK2). In this manner, programmed data PGM_data2 may be preserved.

In other examples, different predetermined numbers Nd for programming loops and different lower limit amounts Cmin may be set for different programming-level states A~G respectively. For example, predetermined numbers Nd of programming loops for programming-level states B and D are "5" and "7" respectively. As shown in FIG. 8B, when number of programming loops NL of "5" for the programming-level state B has reached the predetermined number Nd of "5", the amount of memory cells 102*b* (which have passed verification) in the memory cell 102 is determined whether being less than the lower limit amount Cmin of "25000". On the other hand, as shown in FIG. 8C, when number of programming loops NL of "7" for the programming-level state D has reached the predetermined number Nd of "7", the amount of memory cells 104*b* (which have passed verification) in the memory cell 104 is determined whether being less than the lower limit amount Cmin of "45000".

In addition, the predetermined number Nd of programming loops may be adjusted according to status of the memory device 1000. For example, when the memory device 1000 has been used for a long time and in the end of life, the predetermined number Nd of programming loops may be set as a smaller value.

Compared with the error detection method of FIGS. 3A-3C and FIG. 4, the error detection method of FIGS. 8A-8C may detect abnormal programming operations earlier. Taking programming-level state A as an example, in the example of FIG. 8A, when the number of programming loops NL reaches the predetermined number Nd of "6", it may be immediately checked whether the amount of memory cells 101*b* (which pass the verification) is too small. However, in the example shown in FIG. 3B, before checking whether the number of verifications NV is too large, it is necessary to wait for all the memory cells 101 to pass verification. In other words, when number of programming loops NL reaches "6" the scheme of FIG. 8A may do checking earlier. However, the scheme of FIG. 3B may check later, until more programming loops (e.g., number of programming loops NL of "9") are executed.

Figure 9:
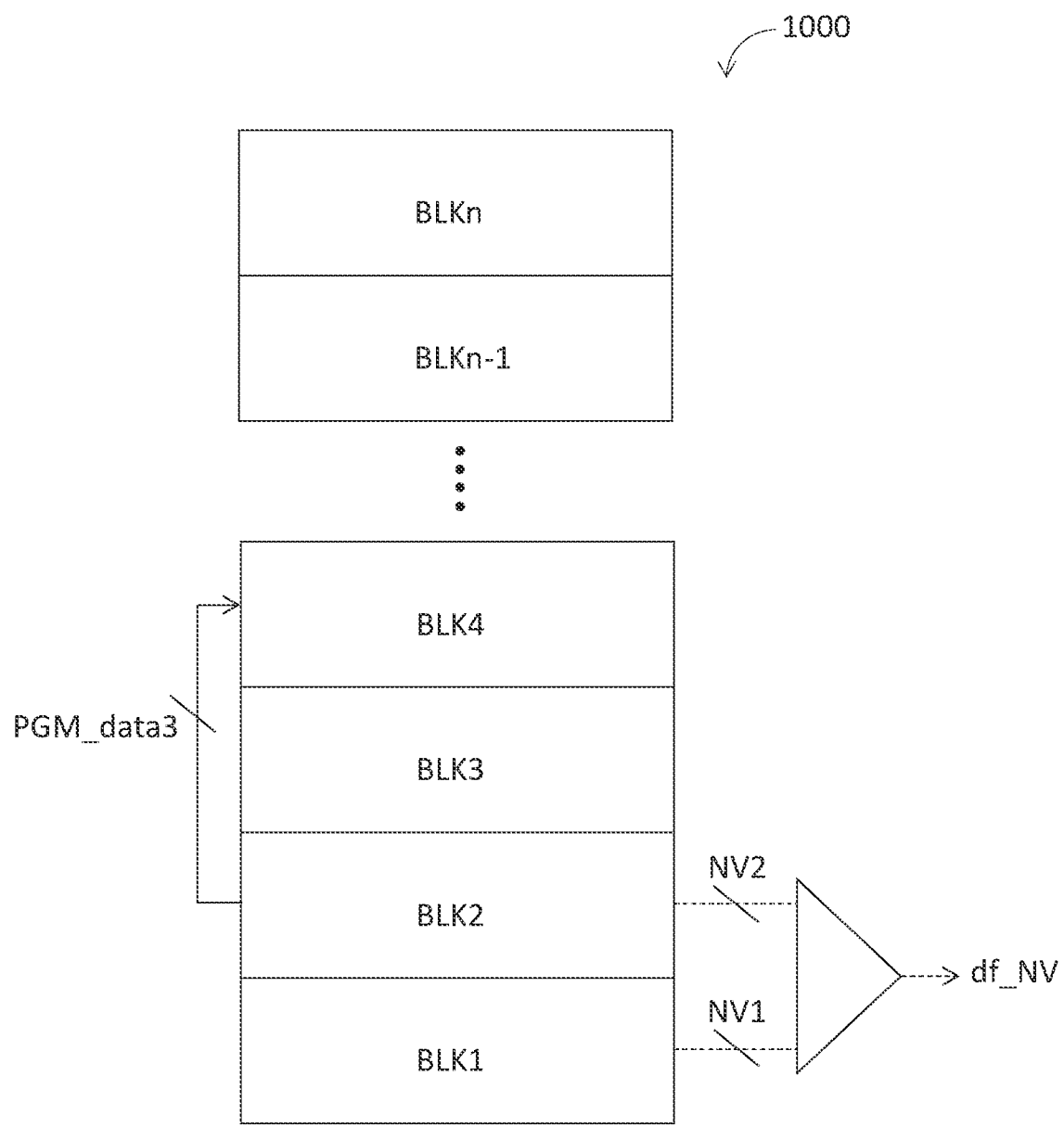
FIG. 9 is a schematic diagram illustrating comparing the number of verifications of two memory blocks, in the error detection method of still another embodiment of the disclosure.

FIG. 9 is a schematic diagram illustrating comparing the number of verifications of two memory blocks, in the error detection method of still another embodiment of the disclosure. Please refer to FIG. 9, programming operations may be performed on the memory blocks BLK1~BLKn in the memory device 1000 respectively, and verifying operations may be performed to verify the programming-level states, and may further analyze number of verifications for the same programming-level state of the two memory blocks. For example, to analyze number of verifications "NV1" for the programming-level state A of the memory block BLK1 (e.g., NV1=10), and analyze number of verifications "NV2" for the same programming-level state A of the memory block BLK2 (e.g., NV2=13). In addition, a difference value "df_NV" between number of verifications NV1 and number of verifications NV2 is calculated, and difference value df_NV equals "3". Furthermore, a standard number "Ns" is set (e.g., setting Ns as "2").

When difference value df_NV of "3" is greater than standard number Ns of "2", it may be determined that at least one of memory blocks BLK1 and BLK2 has abnormal programming operations. In one example, since number of verifications NV2 of "13" of memory block BLk2 is greater than number of verifications NV1 of "10" of memory block BLk1, it may be determined that memory block BLK2 (with greater number of verifications) is abnormal, and memory block BLK2 may be marked as an error memory block. In another example, memory block BLK1 and memory block BLK2 may both have abnormal programming operations, then memory blocks BLK1 and BLK2 are both marked as error memory blocks.

Programming operations for the memory cells in the error memory block BLK2 (the memory cells are not shown in FIG. 9) may be terminated, and a programmed data PGM_data3 in the memory cells of the error memory block BLK2 may be read. Furthermore, the programmed data PGM_data3 may be written into memory cells of another memory block. For example, the memory block BLK4 well functions, and programmed data PGM_data3 may be written into the memory block BLK4 to preserve programmed data PGM_data3. In another example, when memory blocks BLK1 and BLK2 are both marked as error memory blocks, programming operations for the memory cells in the error memory blocks BLK1 and BLK2 may be terminated.

Figure 10:
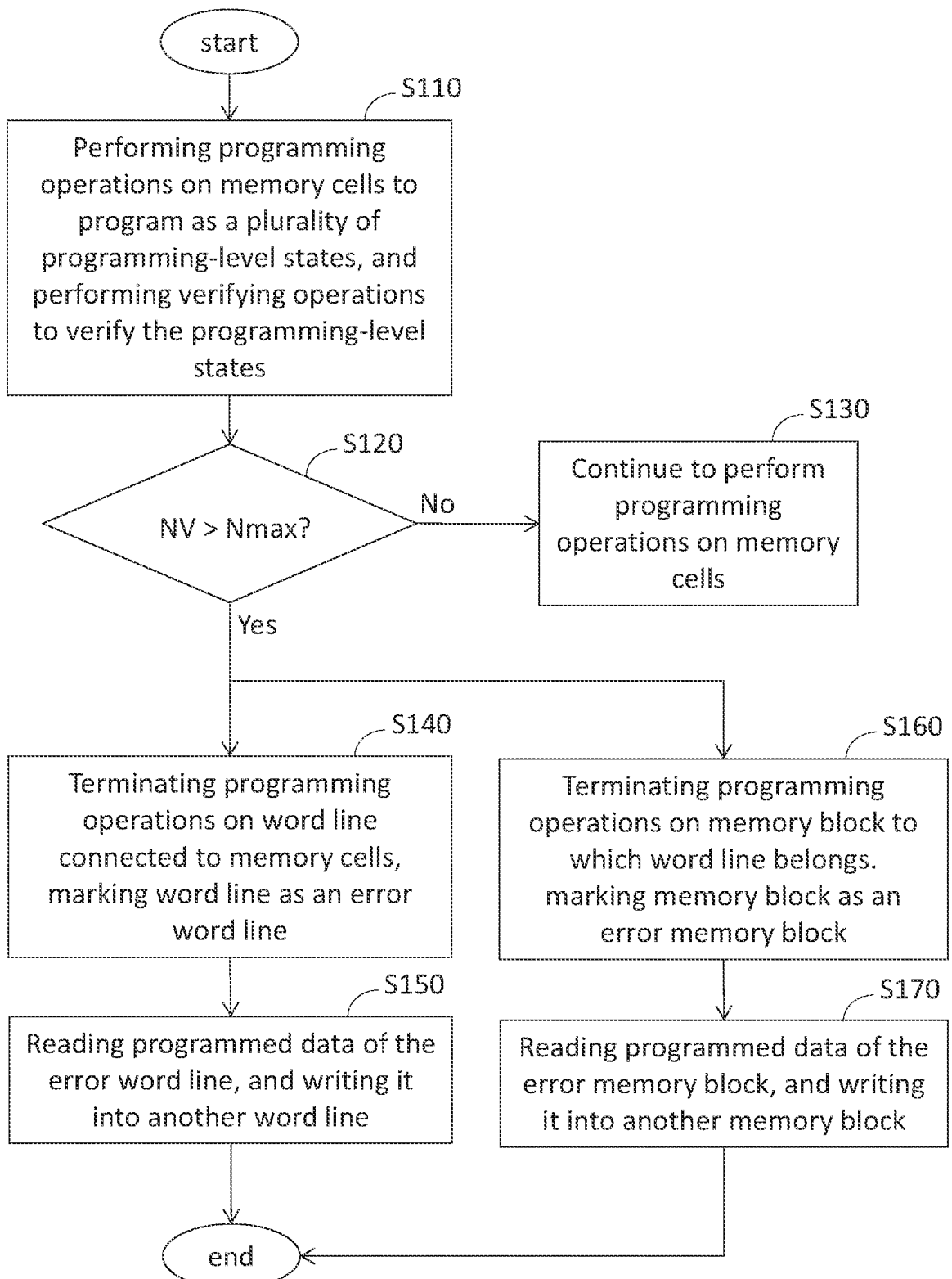
FIG. 10 is a flow diagram of the error detection method of an embodiment of the disclosure.

FIG. 10 is a flow diagram of the error detection method of an embodiment of the disclosure, which corresponds to the embodiment illustrated in FIGS. 3A-3C and FIGS. 4-7. Referring to FIG. 10, in step S110, programming operations are performed to the memory cells 100 (taking triple level cells as an example) to program as the programming-level states A~G, and verifying operations are performed to verify the programming-level states respectively A~G. Then, in step S120, it is determined whether number of verifications NV of anyone of the programming-level states A~G is greater than the respective upper limit number Nmax corresponding to programming-level states A~G. For example, determining whether number of verifications NV of programming-level state A is greater than the upper limit number Nmax-A corresponding to programming-level state A, and determining whether number of verifications NV of programming-level state B is greater than the upper limit number Nmax-B corresponding to programming-level state B, etc. When number of verifications NV for programming-level states A~G is less than or equal to the respective upper limit number Nmax corresponding to programming-level state A~G, it may be determined that programming operations are normal, and then executing step S130: continue to perform the programming operations to the memory cells 100.

On the other hand, when number of verifications NV for programming-level states A~G is greater than the respective upper limit number Nmax corresponding to programming-level state A~G in step S120, it may be determined that the programming operations are abnormal, then executing step S140: terminating programming operations of the word line WL1-1 connected to the memory cells 100, and the word line WL1-1 is marked as an error word line. Then, step S150 is executed to read programmed data of the error word line WL1-1 and write it to another word line.

Alternatively, when number of verifications NV is greater than the upper limit number Nmax in step S120, may also execute step S160: terminating programming operations of the memory block BLK1 (to which the word line WL1-1 belongs), and marking the memory block BLK1 as an error memory block. Then, step S170 is executed to read programmed data in the error memory block BLK1 and write it to another normally operating memory block.

Figure 11:
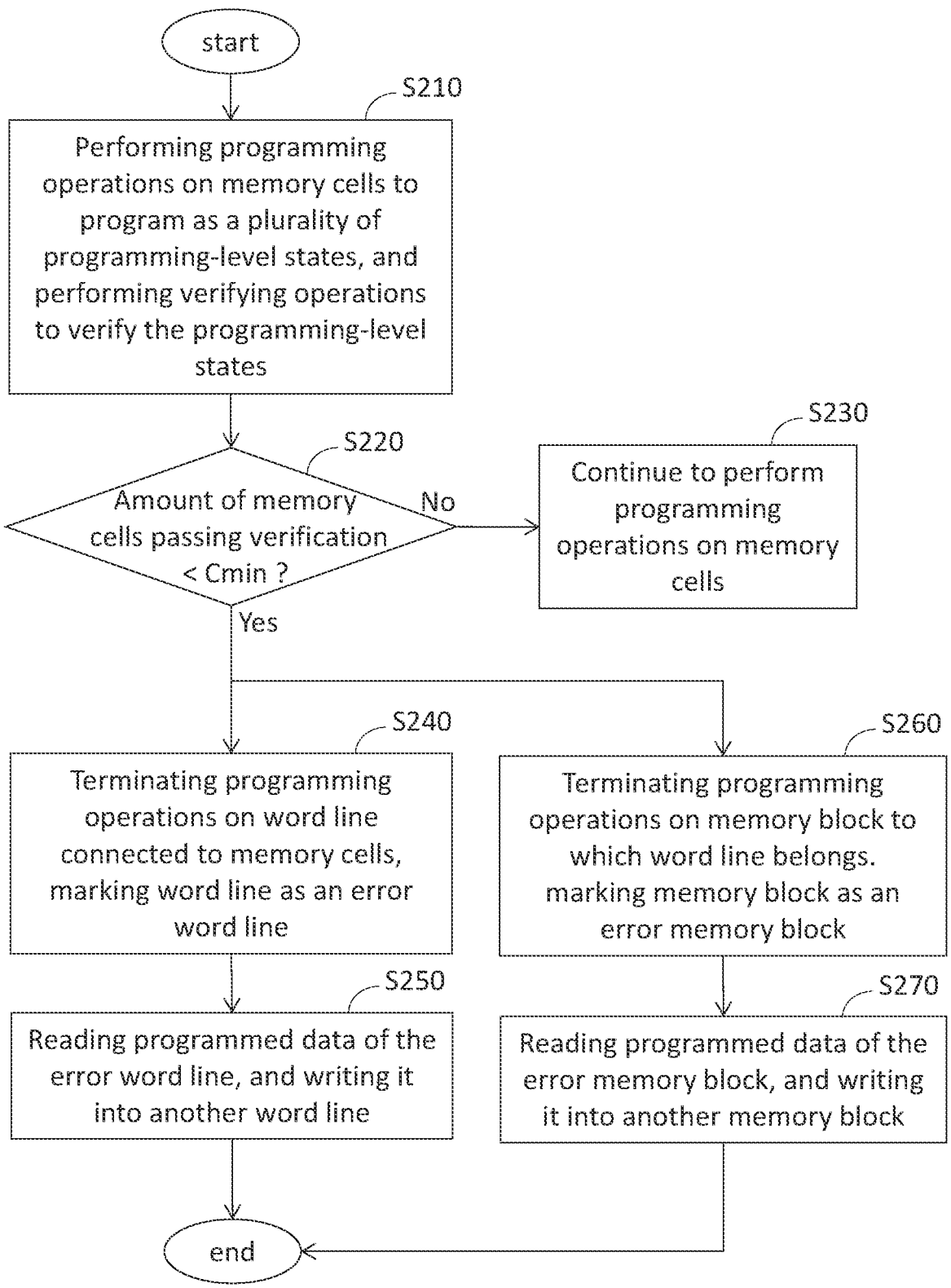
FIG. 11 is a flow diagram of the error detection method of another embodiment of the disclosure.

FIG. 11 is a flow diagram of the error detection method of another embodiment of the disclosure, which corresponds to the embodiment illustrated in FIGS. 8A-8C. The method flow in FIG. 11 is substantially the same as the method flow in FIG. 10, the difference lies in step S220 of FIG. 11. In step S220, it is determined whether amount of memory cells passing verification in one of programming-level states A to G is less than the lower limit amount Cmin. If it is greater than or equal to the lower limit amount Cmin, it may be determined that programming operations are normal, and step S230 is executed. On the other hand, if it is less than the lower limit amount Cmin, it may be determined that programming operations are abnormal, and step S240 is executed.

Figure 12:
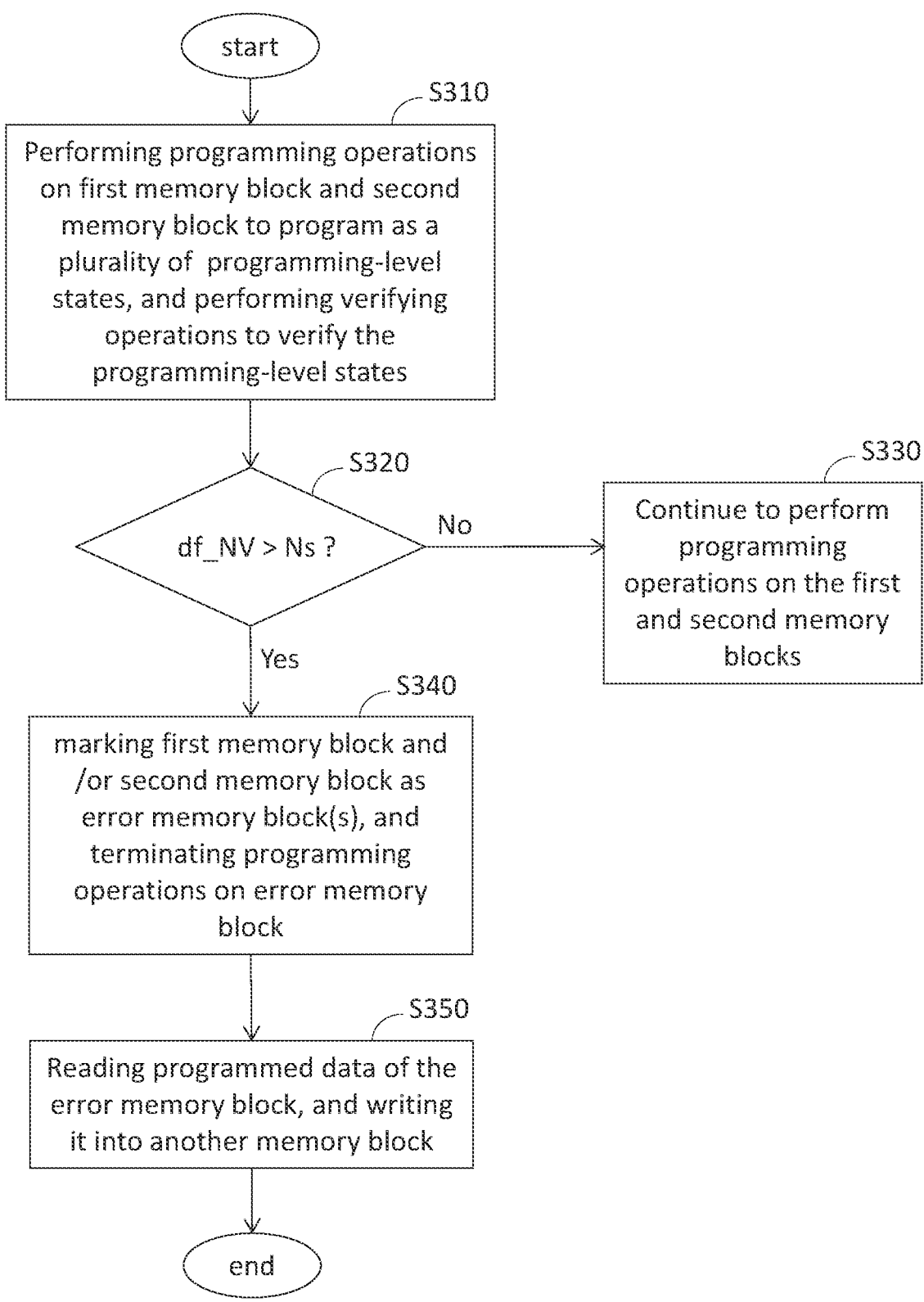
FIG. 12 is a flow diagram of the error detection method of still another embodiment of the disclosure.

FIG. 12 is a flow diagram of the error detection method of still another embodiment of the disclosure, which corresponds to the embodiment illustrated in FIG. 9. Referring to FIG. 12, in step S310, programming operations are performed to the memory cells of the first memory block BLK1 and the second memory block BLK2 of the memory device 1000, so that memory cells of the first memory block BLK1 and the second memory block BLK1 have a plurality of programming-level states A~G (take the triple level cells as an example). In addition, verifying operations are performed on the first memory block BLK1 and the second memory block BLK2 to verify the programming-level states A~G respectively.

Then, in step S320, it is determined whether difference value df_NV between number of verifications NV1 of the first memory block BLK1 and number of verifications NV2 of the second memory block BLK2 for the same programming-level state of the (for example, the same programming-level state A) is greater than the standard number Ns. When the difference value df_NV is less than or equal to the standard number Ns, it may be determined programming operations are normal, then executing step S330: programming operations are continued for the first memory block BLK1 and the second memory block BLK2.

On the other hand, when the difference value df_NV is greater than the standard number Ns, it may be determined that programming operations are abnormal, then executing step S340: the memory block with a larger number of verifications (for example, the second memory block BLK2) is marked as the error memory block, and programming operations of the error memory block BLK2 are terminated. In another example, when first memory block BLK1 and second memory block BLK2 may both have abnormal programming operations, then first memory block BLK1 and second memory block BLK2 are both marked as error memory blocks and their programming operations are terminated.

Then, executing step S350: reading programmed data in the error memory block BLK2, and write programmed data into another normally operating memory block.

According to the above embodiments, the error detection method for the memory device 1000 of the disclosure may analyze and check whether number of verifications NV or number of programming loops NL for different programming-level states is too many (exceeding respective upper limit number Nmax corresponding to programming-level states), so as to determine whether programming operations are abnormal and determine whether word line is abnormal. It may also analyze and check whether the amount of memory cells passing verification in a particular programming-level state is too small (less than lower limit amount Cmin), or analyze and check difference value between number of verifications for two memory blocks (or check difference value between number of programing loops) is too large (exceeding standard number Ns). Solution provided in the disclosure may determine abnormal programming operations in early stage and immediately terminate programming operations. In addition, when it is determined that the word line or memory block is abnormal, programmed data that has been written in the word line or memory block can be read, and programmed data may be written to other normal word line or normal memory block so as to preserve or recover programmed data.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An error detection method for a memory device, wherein the memory device comprises a plurality of memory blocks, and the memory blocks comprise at least a first memory block and a second memory block, the error detection method comprises the following steps:
    performing a plurality of times of programming operations on a plurality of memory cells of the first memory block and a plurality of memory cells of the second memory block to program the memory cells of the first memory block and the memory cells of the second memory block as a plurality of programming-level states;
    performing a plurality of times of verifying operations on the memory cells of the first memory block and the memory cells of the second memory block to verify the programming-level states respectively; and
    when a difference value between the number of verifications of the verifying operations for the same programming-level state of the first memory block and the second memory block is greater than a standard number, marking the first memory block and/or the second memory block as error memory block(s).

2. The error detection method according to claim 1, wherein, marking one of the first memory block and the second memory block which as the larger number of verifications as an error memory block.

3. The error detection method according to claim 1, wherein, marking both the first memory block and the second memory block as error memory blocks.

4. The error detection method according to claim 1, further comprises the following step:

terminating the programming operations of the memory cells of the error memory block.

5. The error detection method according to claim 4, further comprises the following step:

reading a programmed data in the memory cells of the error memory block, and writing the programmed data into a plurality of memory cells of another memory block.

\* \* \* \* \*